(12) United States Patent
Espinosa

(10) Patent No.: US 6,534,923 B2
(45) Date of Patent: Mar. 18, 2003

(54) ELECTRON SOURCE

(75) Inventor: Robert J. Espinosa, Campbell, CA (US)

(73) Assignee: Microwave Power Technology, Campbell, CA (US)

(*) Notice: Subject to any disclaimer, the term of this patent is extended or adjusted under 35 U.S.C. 154(b) by 0 days.

(21) Appl. No.: 09/905,481

(22) Filed: Jul. 13, 2001

(65) Prior Publication Data

US 2003/0011292 A1 Jan. 16, 2003

(51) Int. Cl.⁷ .................................................. H01J 7/24
(52) U.S. Cl. .................. 315/111.81; 313/296; 313/299; 313/310
(58) Field of Search ........................... 315/169.3, 169.1, 315/111.31, 111.61, 111.81; 313/310, 311, 296, 299, 494, 497; 445/50, 51

(56) References Cited

U.S. PATENT DOCUMENTS

| 5,341,063 A | | 8/1994 | Kumar | |
| 5,369,277 A | * | 11/1994 | Knodle et al. | 219/553 |
| 5,602,439 A | | 2/1997 | Valone | |
| 5,723,954 A | * | 3/1998 | Sampayan | 257/10 |
| 5,804,910 A | * | 9/1998 | Tjaden et al. | 313/310 |
| 5,869,922 A | | 2/1999 | Tolt | |
| 5,872,422 A | | 2/1999 | Xu et al. | |
| 5,973,444 A | | 10/1999 | Xu et al. | |
| 6,042,900 A | | 3/2000 | Rakhimov et al. | |
| 6,181,055 B1 | | 1/2001 | Patterson et al. | |
| 6,250,984 B1 | * | 6/2001 | Jin et al. | 313/306 |
| 6,283,812 B1 | * | 9/2001 | Jin et al. | 445/24 |

OTHER PUBLICATIONS

Kwo, J.L., et al., "Field emission characteristics of carbon nanotube emitters synthesized by arc discharge," *J. Vac. Sci. Technol. B*, vol. 19, No. 1, Jan./Feb. 2001.

Yoon, Young Joon, et al., "Synthesis of carbon nanotubes by chemical vapor deposition for field emitters," *J. Vac. Sci. Technol. B*, vol. 19, No. 1, Jan./Feb. 2001.

* cited by examiner

Primary Examiner—Haissa Philogene
(74) Attorney, Agent, or Firm—Dorsey & Whitney LLP

(57) ABSTRACT

An electron source including a nanostructured carbon electron-emitting film and an electron extraction grid spaced closely adjacent the surface of said film.

11 Claims, 2 Drawing Sheets

ELECTRON SOURCE

BRIEF DESCRIPTION OF THE INVENTION

This invention relates generally to an electron source and more particularly to a cold electron source for supplying electrons which can collide with gas molecules to form ions or ion species in vacuum gauges and analytical instruments.

BACKGROUND OF THE INVENTION

Electron emitters used in electron sources are primarily hot filaments which must be operated at temperatures ranging from 1000 to 2200 degrees Celsius. The heating of the cathode requires time and causes gasses to be desorbed from the cathode surface. These gases degrade the measurement environment, particularly in vacuum gauges.

Electron sources using cold emission emitters are known. The electron emission mechanism is electric field assisted tunneling at the surface (field emission) which has the characteristic that the density of the emitted current is determined solely by the electric field at the emitter surface. Since the emitted current is independent of temperature, the full current capacity of the emitter is available at or below room temperature, hence, it is termed a cold cathode or emitter. Current is emitted from the surface when electric field at the surface exceeds a certain value, termed the threshold field. The emitted current increases as the electric field is increased above the threshold field. U.S. Pat. No. 5,278,518 describes an ionization gauge using a cold micropoint cathode. However, such emitters are costly due to the multiple lithographic processes required to produce them. In addition, they have limited operational life when operated at pressures higher than $10^{-6}$ Torr.

U.S. Pat. Nos. 5,869,922 and 6,042,900 describe emitter surfaces comprising nano-diamond and nano-carbon structures and their formation. J. L. Kwo et. al., J. Vac. Sci. Technol. B 19(1), Jan/Feb 2001, 23–25, and Young Joon Yoon et. al., J. Vac. Sci. Technol. B 19 (1), Jan/Feb 2001, 26–31 describe carbon nanotubes and their formation suitable for use as cold electron emitters. These emitters are highly efficient, easy to manufacture and operate at higher pressures for considerable periods.

OBJECTS AND SUMMARY OF THE INVENTION

It is an object of the present invention to provide an electron source employing emitters having emitting films of nanocrystalline graphite and diamond, carbon nanotubes and combinations thereof, herein nanostructured carbon films.

It is another object of the present invention to provide an inexpensive, simple and efficient electron source.

The foregoing and other objects of the invention are achieved with an electron source which includes an emitter having a nanostructured carbon emitting film and a closely spaced grid for applying electric fields to the film to cause electron emission and acceleration of the emitted electrons through the grid.

BRIEF DESCRIPTION OF THE DRAWINGS

The invention will be more clearly understood from the following description when read in conjunction with the accompanying drawings in which.

DESCRIPTION OF PREFERRED EMBODIMENTS

Figure 1:
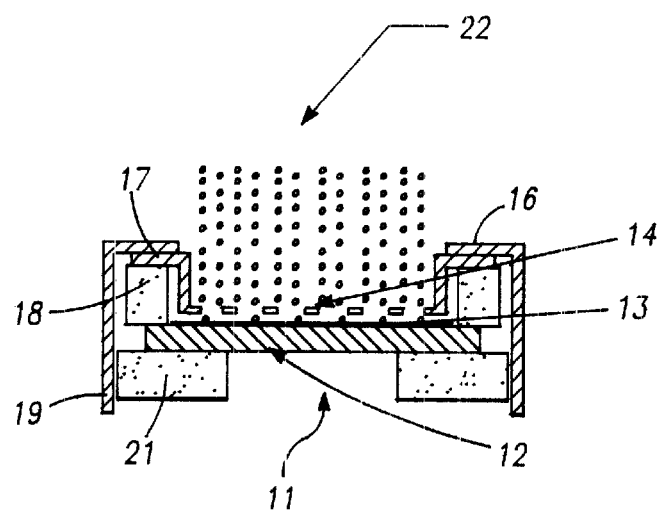
FIG. 1 is a sectional view of an electron source in accordance with one embodiment of the present invention.

The electron source includes a cold electron emitter or cathode 11, FIG. 1. The cold cathode emitter includes a metal, ceramic or semiconductor substrate 12 onto which is formed and electron emitting film 13. The film comprises nanostructured carbon which may be formed as disclosed in the patents and articles referred to above. The emitter film is deposited on an area tailored in shape and size to produce sufficient current and electron beam cross-section suited to specific applications when a voltage is applied between the electron extraction grid 14 and the closely-spaced surface of the film 13. The magnitude of the emitted current is controlled by the magnitude of the voltage or potential. The close spacing assures that electric fields above the threshold value can be achieved with low voltages applied to the grid. The electron extraction grid 14 is carried at the bottom of a cup shaped electrode or frame 16 which has a rim 17. The spacing between the extraction grid and the film 13 is determined by the ring-shaped insulator 18.

Extraction grids must be placed very close to the emitter surface to achieve the lowest possible extraction voltage. Grid to emitter spacing is typically less than 100 microns and requires that the grid 14 be extremely flat and remain so during operation. Bonding the outer perimeter of refractory metal grid to a frame that has a lower thermal expansion rate than the grid material at high temperature achieves those desired characteristics. A desired embodiment of this technique is to bond a molybdenum grid 14 to a tungsten support or frame 16. As the bonded grid and support assembly cools, the radial tension developed in the grid, because of the higher thermal expansion of the grid than the frame, stretches it tight as in stretching a drum head, keeping the grid very flat. Alternatively, the grid can be bonded to a ceramic frame, which also serves at the emitter to grid insulator, to achieve the same result. When the bond of the grid to the frame is made by diffusion or brazing, it minimizes the temperature rise across the contact area to facilitate the conduction of the heat generated by intercepted electrons from the grid, keeping it cooler, and therefore flatter, during operation of the electron gun.

A cylindrical housing or enclosure 19 engages the rim 17, and insulator 21 secured to the enclosure 19 supports the emitter substrate 12. The cylindrical housing not only holds the parts of the electron source aligned, but also serves as an electromagnetic shield which isolates the electric fields within the source from the interaction region of the device with which it is used. When a voltage or potential above the threshold value is applied between the extraction grid and the emitter an electron stream 22 is emitted. The cylindrical portion of the cup-shaped electrode 16 also serves as a focusing electrode. The extraction grid is a conducting plate with an array of holes to allow all or a significant percentage of the emitted current to pass through the interaction region of the device in which it is installed. Additional electrodes may be added to the assembly with appropriate potentials applied to them for further focusing an acceleration or deceleration of the electron beam to suit the requirements of the device with which it is used.

Figure 2:
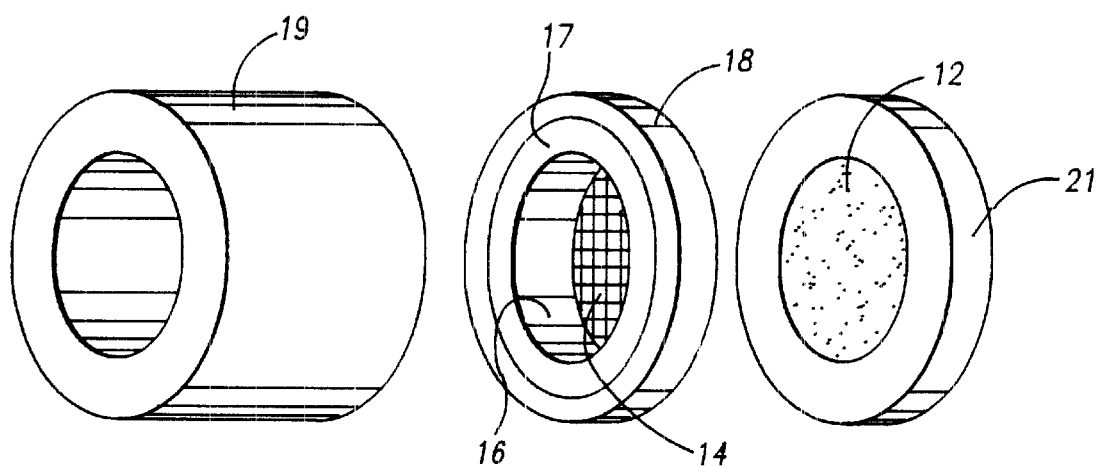
FIG. 2 is a perspective exploded view of the electron source of FIG. 1.

FIG. 2 is an exploded perspective view of the electron source shown and described with reference to FIG. 1 with like reference numerals applied to like parts. It is apparent that other electron source assemblies can be designed which support an extraction grid closely spaced from a nanostructured carbon emitting film.

Figure 3:
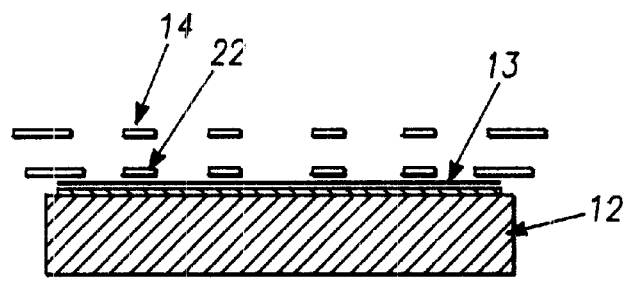
FIGS. 3, 4 and 5 show arrangements for controlling the pattern of the emitted electrons and for masking the grid.

When a single extraction grid is used, as shown and described above, emitted electrons are intercepted by the grid. This tends to heat the grid and limit the amount of current that can be obtained from the electron gun. Intercepted electrons can be greatly reduced by placing a masking grid on or very near the emitting surface, and precisely aligned with the extraction grid, to block emitted electrons directly below the extraction grid. That is, the extraction grid sits in the shadow of the masking grid. A shadow or masking grid 22 is shown in FIG. 3. The shadow grid has the same configuration of openings as the extraction grid. The shadow grid is supported in alignment between the extraction grid and the emitting surface and spaced from the emitting surface.

Figure 4:
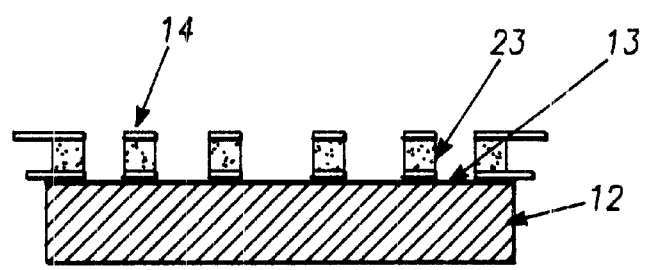
Figure 5:
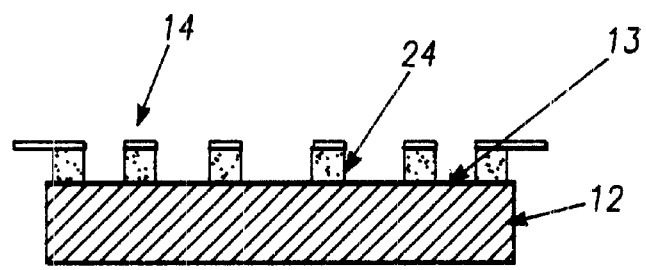

Placing the grids close to the emitting surface and obtaining the necessary alignment in electron sources using thermionic emitters is difficult because the emitter surface is raised to high temperatures. The shadow grid must be treated to prevent emission, or it will also become an emitting surface when heated by radiation from the emitter. The difficulty and cost of achieving low extraction grid interception is a major cost in the production of thermionic electron sources which require current control and modulation The use of cold nanostructured carbon film emitters simplifies the use of shadow grids and masks because no deleterious effects from placing the mask directly on or closely adjacent the emitter surface. Alignment of the extraction and shadow grids can be further simplified by constructing the grid pair with an insulating layer 23, FIG. 4, between them to maintain uniform spacing and alignment across the entire emitting surface. An alternative is to bond the extraction grid to an insulating grid 24, FIG. 5. The insulating grid engages the emitting film to support the grid and prevent emission of electrons.

The combination of a nanostructured carbon emitter, masking grid and extraction grid provides a stable high-current electron source which is immune to effects of vibration and stresses due to thermal heating.

The foregoing descriptions of specific embodiments of the present invention are presented for the purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An electron source comprising:
   a substrate,
   a nanostructured carbon electron-emitting film formed on one surface of the substrate, and
   an apertured extraction grid spaced from said electron-emitting film for applying an electron extraction and accelerating electric field to said electron-emitting film in which said apertured extraction grid is supported by a cylindrical member to form a cup-shaped electrode in which the cylindrical member serves to focus electrons leaving said electron-emitting film.

2. An electron source as in claim 1 including an apertured masking grid interposed between the extraction grid and film with its apertures in registration with the extraction grid apertures.

3. An electron source as in claim 1 including an assembly including apertured masking grid and an apertured insulating member sandwitched between the apertured masking grid and the extraction grid.

4. An electron source as in claim 1 including an apertured insulating member secured to said masking grid with its apertures in registration with the extraction grid apertures, said apertured insulating member disposed between the extraction grid and the electron-emitting film.

5. An electron source as in claim 1 including a cylindrical housing secured to and surrounding said extraction grid electrode and an insulator secured to said cylindrical housing to support said substrate.

6. An electron source as in claims 1 or 4 in which the nanostructured carbon electron-emitting film comprises nanocrystalline graphite and diamond or carbon nanotubes or combinations thereof.

7. An electron source comprising:
   a substrate,
   a nanostructured carbon electron-emitting film carried on one surface of said substrate,
   an extraction grid support for supporting an extraction grid spaced from said film, and
   an apertured extraction grid having a coefficient of thermal expansion greater than that of the extraction grid support secured to said extraction grid by thermal bonding whereby said grid is stretched on the extraction grid support.

8. An electron source as in claim 7 in which said extraction grid support is tungsten and said grid is molybdenum.

9. An electron source as in claim 7 in which said extraction grid support is ceramic.

10. An electron source as in claims 7 or 8 in which said extraction grid support is cup-shaped.

11. An electron source as in claims 7, 8 or 9 in which the nanostructured carbon electron-emitting film comprises nanocrystalline graphite and diamond or carbon nanotubes or combinations thereof.

* * * * *